June 20, 1944.  J. GÄBLER  2,351,947
AERIAL FOR MOTOR VEHICLES
Filed March 7, 1939
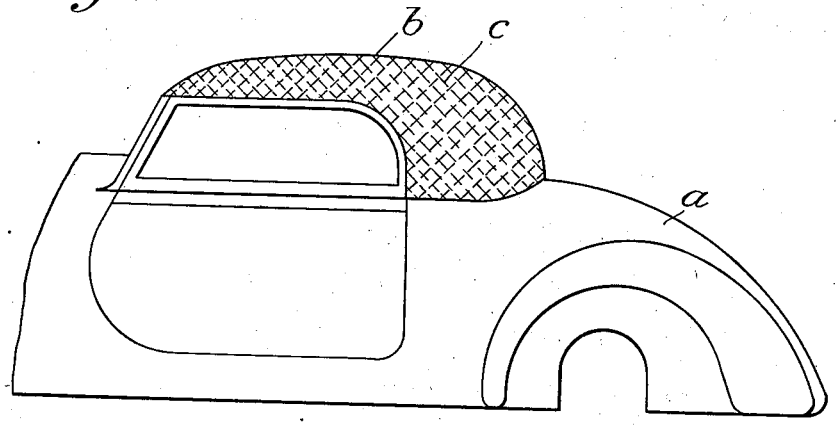
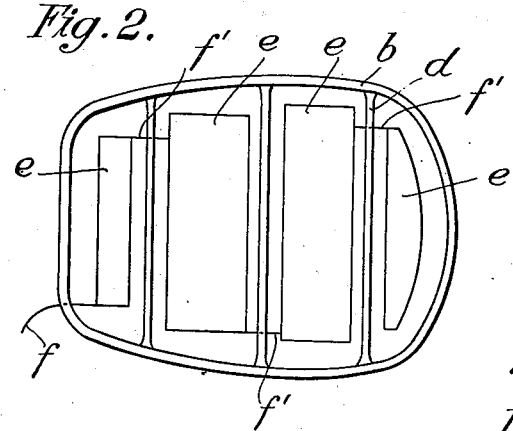
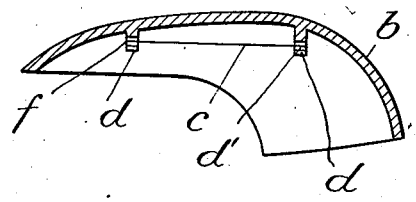
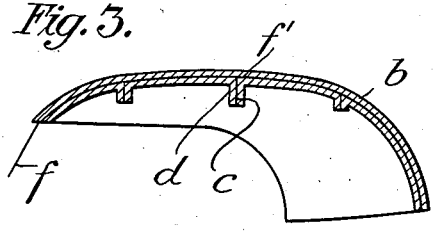
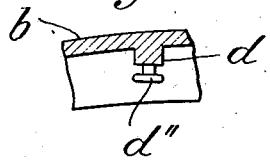
INVENTOR
JOHANNES GÄBLER
BY
ATTORNEY Patented June 20, 1944

2,351,947

UNITED STATES PATENT OFFICE 2,351,947

AERIAL FOR MOTOR VEHICLES

Johannes Gäbler, Stuttgart-Unterturkheim, Germany; vested in the Alien Property Custodian Application March 7, 1939, Serial No. 260,249
In Germany March 10, 1938

3 Claims. (Cl. 250—33)

The invention relates to an aerial, for operation with high-frequency oscillations, for motor vehicles having a bodywork of pressed material. Principal objects of the invention are to permit of the aerial being applied in particularly simple fashion, or to utilize existing parts of the body as the aerial.

According to the invention, in motor vehicles with bodywork of pressed material, either metal insertions or sprayed-on or stuck-on electrically conducting materials are used as the aerial and are so contrived that the lead-in to the receiving apparatus can be effected from a suitable point. The metallic insertions may be such that they serve not only as an aerial, but also at the same time as stiffeners for the vehicle body. When pressed material is used for the production of bodies, it is possible to stick or spray electrically conducting materials directly to the insulating walls and, in some cases, to protect the same from damage by an insulating coating which may also be sprayed-on and which forms at the same time the normal interval or external covering.

Screening of the aerial necessary to avoid interference may be effected in simple manner, by accommodating the conductors in separate ribs or hollow spaces in the bodywork of pressed material. Thus harmful influence upon the aerial is avoided to a considerable extent.

In a further constructional example, separate conductors are stretched between pressed supporting parts on the bodywork, in which case these supporting parts may be provided from the start with recesses or projections for the reception of the conductors forming the aerial. Also, the aerial may be constructed so that existing stiffening insertions are connected together with stuck-on or sprayed-on electrically conducting materials which thus represent an extremely effective arrangement for the reception of high-frequency oscillations.

The particular advantage of the above-described aerial arrangement resides in the simplicity, reliability and cheapness of production. Also, the aerial parts are protected against any damage by external influences and may be applied completely invisibly without the necessity for providing special structural parts. By sticking-on or spraying on electrically conducting materials, the aerial can be applied subsequently at any time without any structural alterations whatever.

Various embodiments of the invention by way of example are illustrated diagrammatically in the drawing, in which:

Figure 1 is an elevation of a vehicle body made of pressed material and fitted with one form of aerial.

Figure 2 is an inverted plan of the interior of a vehicle roof fitted with another form of aerial.

Figures 3 and 4 are longitudinal sections of the vehicle roofs with other forms of aerial and, Figure 5 is a section to a larger scale of part of a vehicle roof provided with aerial supports.

In Figure 1, the body $a$ has a unitary roof part or structure $b$ which is made of pressed material and which, for example, encloses the pressed-in aerial $c$. The electrically conducting materials constituting the aerial $c$ may serve at the same time for stiffening the body or the body parts and in turn the aerial is protected by the roof structure against injury and displacement.

In Figure 2, the interior of the vehicle roof $b$, has stiffening ribs $d$. In the panels between these ribs, surfaces $e$ of electrically conducting materials are applied to the panel faces by spraying or the surfaces $e$ may be stuck to such panel faces. Since the electrically conducting materials are positioned in the channels between the ribs, it is apparent that they will be protected against injury and displacement. The surfaces $e$ are connected together by conductors $f^1$ and a common lead-in $f$ passes from one of the surfaces $e$ to the receiving apparatus.

In Figure 3, electrically conducting materials $c$ are pressed into the ribs $d$ of the vehicle roof $b$ and are connected together by a conductor $f^1$ and to the receiving set by a lead $f$.

In Figure 4, electrical conductors $c$, for example wires, are stretched between the existing ribs $d$ of the vehicle roof; the aerial lead to the receiving set being again indicated by $f$. For supporting the conductors, recesses, such as bores $d^1$, may be pressed in the ribs $d$ at the time of production, the conductors being drawn through such recesses or bores, as shown. Or the ribs $d$ as illustrated in Figure 5, may be provided with pressed-on projections $d^{11}$ to which the wires are attached.

Obviously, the examples illustrated can be multiplied at will and, in particular, a combination of pressed-in, stuck-on and sprayed-on electrically conducting materials may be used to produce an aerial formation.

I claim:

1. In a vehicle, the combination of a unitary roof structure formed of a rigid insulating material adapted to be pressed into the form of said roof having an outer surface and an inner surface within said vehicle, a plurality of spaced reenforcing ribs formed integrally with and depending from said surface within said vehicle and dividing said inner surface into a plurality of sections, a radio aerial positioned within at least one of said sections and supported therein by said roof structure with said ribs serving as protecting means for said aerial, said aerial being formed of conducting material which serves to reenforce said roof structure.

2. In a vehicle, the combination of a unitary roof structure formed of a rigid insulating material adapted to be pressed into the form of said roof having an outer surface and an inner surface within said vehicle, at least one reenforcing rib formed integrally with and depending from said surface within said vehicle, a radio aerial formed of conducting material supported beneath said roof structure by said depending rib a spaced distance from said surface within said vehicle.

3. In a vehicle, the combination of a unitary roof structure formed of a rigid insulating material adapted to be pressed into the form of said roof having an outer surface and an inner surface within said vehicle, a plurality of spaced reenforcing ribs formed integral with and depending from said surface within said vehicle, a radio aerial formed of conducting material supported beneath said roof structure by said integral formed depending ribs a spaced distance from said surface within said vehicle.

JOHANNES GÄBLER.